United States Patent
Drennen et al.

(10) Patent No.: US 9,638,300 B2
(45) Date of Patent: May 2, 2017

(54) ELECTROMECHANICAL ACTUATOR PROXIMAL POSITION STOPPING ASSEMBLY

(71) Applicant: GOODRICH CORPORATION, Charlotte, NC (US)

(72) Inventors: David B. Drennen, Bellbrook, OH (US); Harald Klode, Centerville, OH (US); Kevin Rehfus, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 96 days.

(21) Appl. No.: 14/069,189

(22) Filed: Oct. 31, 2013

(65) Prior Publication Data

US 2015/0114150 A1    Apr. 30, 2015

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/22* | (2006.01) |
| *F16H 25/20* | (2006.01) |

(Continued)

(52) U.S. Cl.
CPC ..... *F16H 25/2204* (2013.01); *F16H 25/2015* (2013.01); *H02K 7/06* (2013.01); *F16H 2025/2078* (2013.01); *H02K 7/116* (2013.01); *Y10T 74/18576* (2015.01)

(58) Field of Classification Search
CPC .......... F16H 25/22; F16H 25/20; F16H 65/16; H02K 7/06; F16D 65/18; F16D 2125/587; F16D 2121/24; F16D 2125/40; F16D 2125/50; F16D 2066/003; Y10T 74/19702; Y10T 74/18664

USPC .......... 74/89.23, 89.27, 89.34, 89.36, 89.37, 74/424.71, 424.81; 188/72.1, 72.7, 72.8, 188/82.83, 156, 157, 158, 161, 162
See application file for complete search history.

(56) References Cited

U.S. PATENT DOCUMENTS 6,139,460 A  * 10/2000  Drennen et al. ............. 188/72.1
6,367,592 B1 *  4/2002  Kapaan ................... F16D 65/18
                                                    188/72.1

(Continued)

FOREIGN PATENT DOCUMENTS

FR       2848171         6/2004

OTHER PUBLICATIONS

Extended European Search Report dated Mar. 15, 2016 in European Application No. 14191165.1.

*Primary Examiner* — William Kelleher
*Assistant Examiner* — Jake Cook
(74) *Attorney, Agent, or Firm* — Snell & Wilmer L.L.P.

(57) ABSTRACT

An electromechanical actuator (EMA) is disclosed. The EMA may comprise an EMA housing, a ball nut extending axially within the EMA housing, a ball screw extending axially within the ball nut, and/or an actuator drive unit (ADU) housing extending axially within the ball screw, the ADU housing having a proximal stop that extends radially outward of the ADU housing. The ball nut may be configured to translate axially in a proximal direction in response to a rotation by the ball screw, and the ball nut may be configured to be halted in the axially proximal translation in response to contact with the proximal stop. The proximal stop may be coupled to the ADU housing. The proximal stop may comprise a continuous annular structure.

13 Claims, 5 Drawing Sheets

(51) Int. Cl.
*H02K 7/06* (2006.01)
*H02K 7/116* (2006.01)

(56) References Cited

U.S. PATENT DOCUMENTS

| | | | |
|---|---|---|---|
| 6,367,593 B1* | 4/2002 | Siler | F16D 65/18 |
| | | | 188/72.1 |
| 6,367,597 B1* | 4/2002 | De Vries et al. | 188/196 V |
| 6,907,967 B1* | 6/2005 | Kapaan et al. | 188/162 |
| 2004/0200676 A1* | 10/2004 | Chang et al. | 188/72.8 |
| 2007/0029142 A1 | 2/2007 | Drennen et al. | |
| 2011/0072921 A1* | 3/2011 | Himmelmann | 74/89.37 |

* cited by examiner

ELECTROMECHANICAL ACTUATOR PROXIMAL POSITION STOPPING ASSEMBLY

FIELD

The present disclosure relates to electromechanical actuators ("EMAs"), and more particularly, to a stopping assembly for EMAs.

BACKGROUND

EMAs are braking assemblies that forcefully move a translating member (such as a "ball nut") against a brake disk stack to generate an actuation force. This actuation force drives the ball nut into forceful engagement with the brake disk stack to generate a braking force.

SUMMARY

An electromechanical actuator (EMA) is disclosed. The EMA may comprise an EMA housing, a ball nut extending axially within the EMA housing, a ball screw extending axially within the ball nut, and/or an actuator drive unit (ADU) housing extending axially within the ball screw, the ADU housing having a proximal stop that extends radially outward of the ADU housing. The ball nut may be configured to translate axially in a proximal direction in response to a rotation by the ball screw, and the ball nut may be configured to be halted in the axially proximal translation in response to contact with the proximal stop. The proximal stop may be coupled to the ADU housing. The proximal stop may comprise a continuous annular structure. The ball nut may make contact with the proximal stop as the ball nut translates axially to halt the axially proximal translation of the ball nut. The proximal stop may include a compliant surface. The ball nut may be configured to advance axially in a distal direction away from the proximal stop and/or to retract axially in the proximal direction towards the proximal stop. A position of the ball nut may be determined based upon a gear ratio.

An EMA is disclosed. The EMA may comprise an EVA housing, a ball nut extending axially within the EMA housing, and/or an ADU housing disposed radially inward of the ball nut, the ADU housing having a proximal stop that extends radially outward of the ADU housing, ball nut being configured to translate axially in a proximal direction and to be halted in the axially proximal translation in response to contact with the proximal stop. The proximal stop may be coupled to the ADU housing. The proximal stop may comprise a continuous annular structure. The ball nut may make contact with the proximal stop as the ball nut translates axially to halt the axially proximal translation of the ball nut. The proximal stop may include a compliant surface. The ball nut may be configured to advance axially in a distal direction away from the proximal stop. The ball nut may be configured to retract axially in the proximal direction towards the proximal stop.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, an "inner surface" may comprise any surface that is situated radially inward of any other surface with respect to the axis, as defined herein, labeled A-A'. Thus, an inner surface may be situated radially inward of an "outer surface" with respect to the axis A-A'.

In addition, the EMA may extend along the axis defined by the line marked A-A'. The portion near A may be referred to as proximal and the portion near A' may be referred to as distal. In that regard, A is proximal to A' and A' is distal to A. Translation in an axial direction towards A is considered movement in a proximal direction and translation in an axial direction towards A' is considered movement in a distal direction.

Figure 1A:
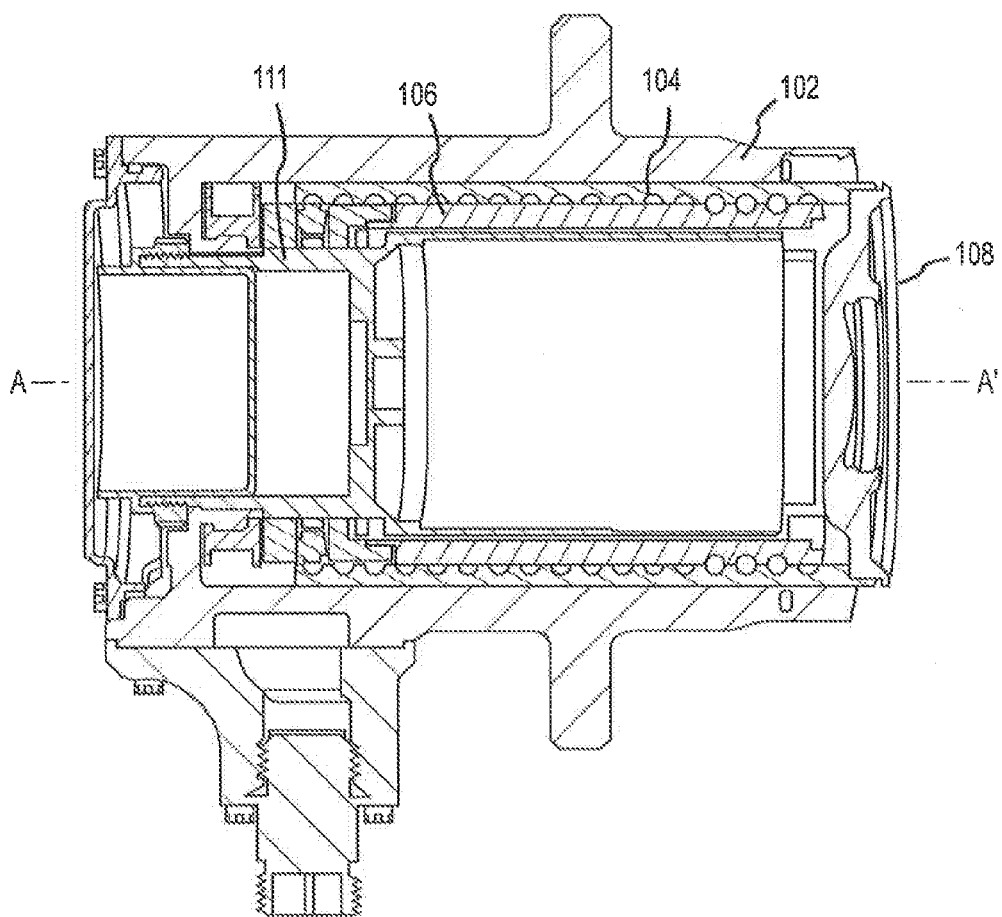
FIG. 1A illustrates a cross-sectional schematic view of a conventional EMA.

With reference to FIG. 1A, a cross-sectional schematic view of a conventional EMA 100 is shown. The EMA 100 may comprise an EMA housing 102, an actuator drive unit ("ADU") housing 111, a ball nut 104, a ball screw 106, and a disc or "puck" 108. The EMA housing 100 may comprise a generally annular structure configured to house the ball nut 104 and extending along the axis A-A'. The ball nut 104 may comprise a generally annular housing that extends axially along the axis A-A' within the EMA housing 102. The ball screw 106 may comprise a generally annular housing that extends axially along the axis A' A' within the ball nut 104. The ADU housing 111 may comprise a generally annular housing that extends axially along the axis A-A' at least partially radially inward of the ball screw 106. A variety of drive components may be housed within the ADU housing 111, such as, for example, an electromechanical drive motor, drive shaft, gearing system, and the like. The ADU housing 111 may comprise a stationary (non-rotating, non-translating) component. The puck 108 may comprise a generally disc shaped element, and the puck 108 may be coupled to a distal portion of the ball nut 104.

An inner surface of the ball nut 104 may be helically threaded. Likewise, an outer surface of the ball screw 106 may be helically threaded. As described above, the ball screw 106 may be housed within the ball nut 104, and the threading on the outer surface of the ball screw 106 may interface with or mate with the threading on the inner surface of the ball nut 104.

During operation, the ball screw 106 may rotate about an axis A-A'. As the ball screw 106 rotates, the threading on the ball screw 106 may cooperate with the threading in the ball nut 104 to drive the ball nut 104 in a distal direction. As the ball nut 104 translates distally, the puck 108 coupled to the ball nut 104 may also translate distally. The puck 108 may contact a brake stack (e.g., a brake stack associated with an aircraft wheel) to apply force to the brake stack, thereby slowing and/or halting the rotation of the aircraft wheel.

Figure 1B:
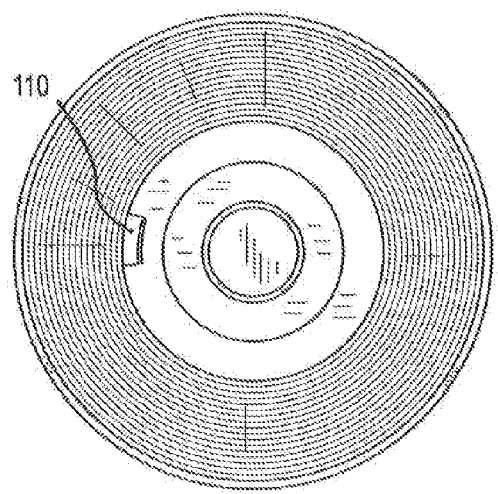
FIG. 1B illustrates top perspective view of a conventional ball nut.

With reference to FIG. 1B, a longitudinal perspective view of a conventional ball nut 104 (looking from A to A' toward a distal portion of the ball nut 104 along the longitudinal axis A-A') is shown. This ball nut 104 includes a concentrically situated projection 110 or "tooth," located at a distal portion of the ball nut 104.

Figure 1C:
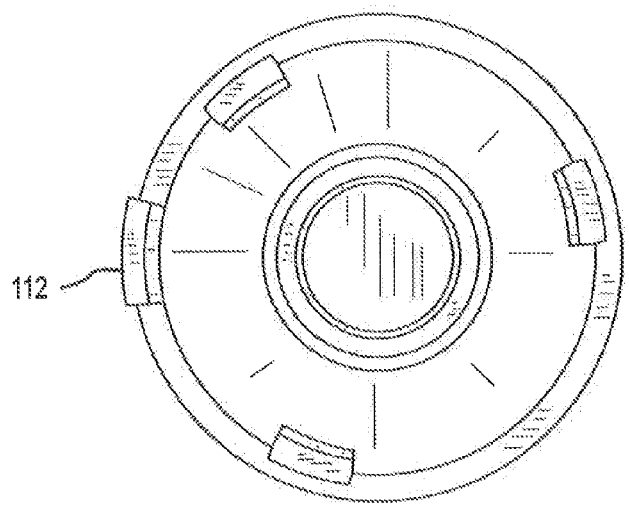
FIG. 1C illustrates a top perspective view of a conventional ball screw.

With reference to FIG. 1C, a longitudinal perspective view of a distal portion of a conventional ball screw 106 is shown. The ball screw 106 includes a concentrically situated projection 112 or tooth as well. This projection 112, like the projection 110, is situated at a distal portion of the ball screw 106.

In operation, as described above, as the ball screw 106 rotates, the ball nut 104 may translate proximally (and/or distally) along the axis A-A' until the projection 112 in the ball screw 106 rotates into contact with the projection 110 in the ball nut 104. As the projection 112 makes contact with the projection 110, the ball nut 104 may be halted in its proximal progress, even as the ball screw 106 may attempt to rotate in an effort to force the ball nut 104 proximally into a home stop or stowed position.

A variety of disadvantages are associated with the conventional system depicted at FIGS. 1A-1C. For example, the projection 112 may rotate with substantial angular momentum into the projection 110. As this occurs, the projection 112 and/or the projection 110 may chip or break. Failure of either projection 110 and/or 112 may result in expulsion of the entire ball nut 104 from its housing within the EMA housing 102, leaving the ball nut 104 (and/or other components) behind as litter and/or other dangerous debris. Such an event may, in addition, result in brake failure. Thus, a variety of disadvantages are associated with existing conventional systems.

Figure 2A:
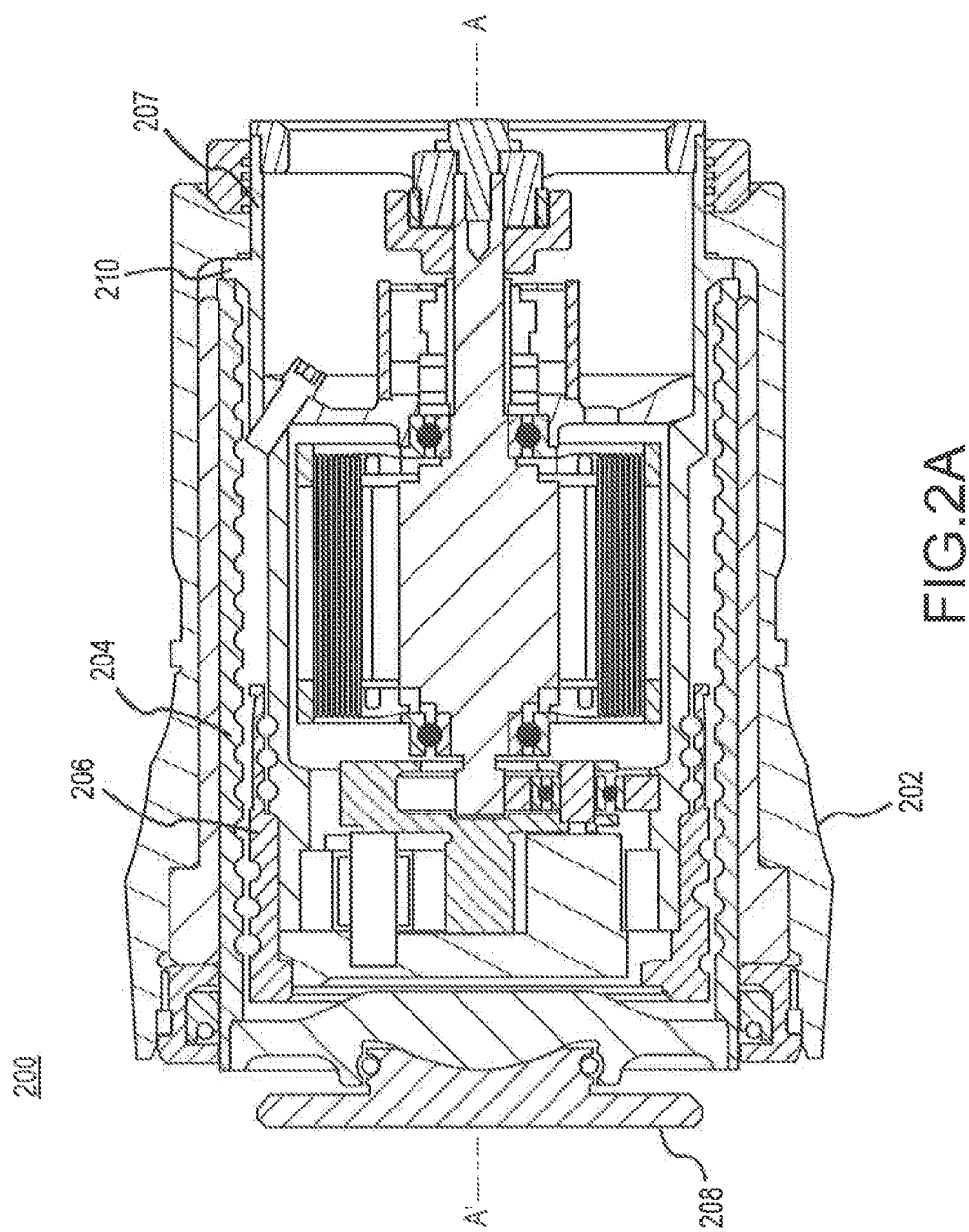
FIG. 2A illustrates, in accordance with various embodiments, a cross-sectional schematic view of an EMA.

Now, with reference to FIG. 2A, an EMA 200 is shown. The EMA 200 may, like the EMA 100, comprise an EMA housing 202, a ball nut 204, a ball screw 206, an ADU housing 207, and a disc or puck 208. As above, the EMA housing 200 may comprise a generally annular structure configured to house the ball nut 204 and extending along the axis A-A'. The ball nut 204 may comprise a generally annular housing that extends axially along the axis A-A' within the EMA housing 202. The ball screw 206 may comprise a generally annular housing that extends axially along the axis A-A' within the ball nut 204. The ADU housing 207 may comprise a generally annular housing that extends axially along the axis A-A' at least partially radially inward of the ball screw 206. A variety of drive components may be housed within the ADU housing 207, such as, for example, an electromechanical drive motor, drive shaft, gearing system, and the like. The puck 208 may comprise a generally disc shaped element, and the puck 208 may be coupled to a distal portion of the ball nut 204.

Figure 2B:
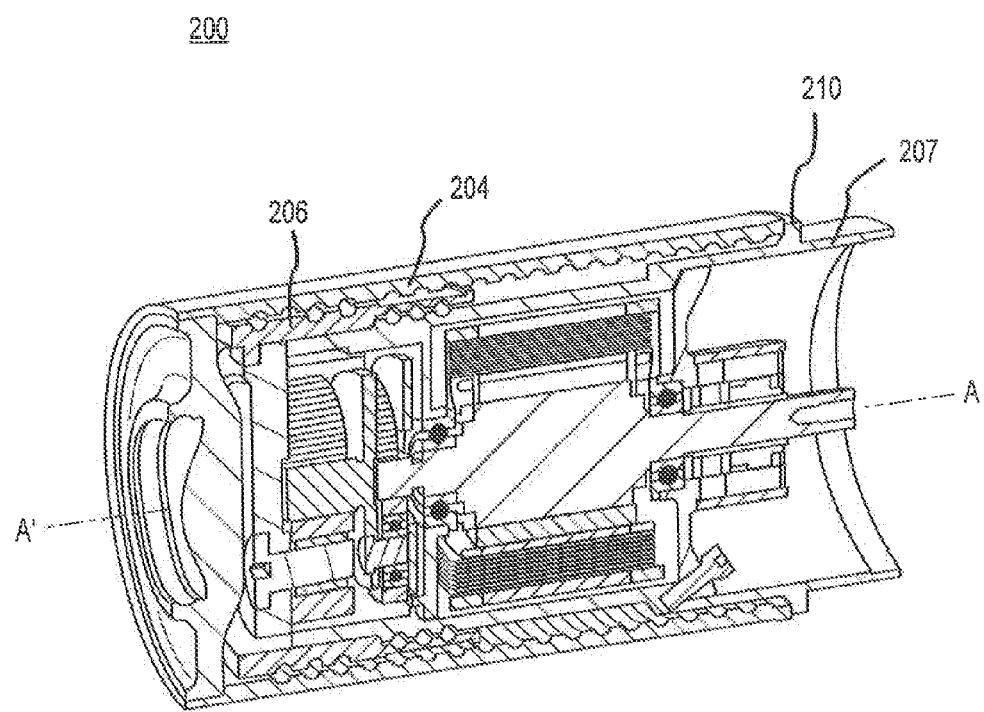
FIG. 2B illustrates, in accordance with various embodiments, a partial cross-sectional schematic view of an EMA.

However, as shown in greater detail at FIG. 2B, the EMA 200 described herein may comprise an ADU housing 207 comprising a projection or stop 210 extending radially outward of the ADU housing 207. The stop 210 may extend radially outward such that it is raised above an outer surface of the ADU housing 207. In addition, the stop 210 may be disposed substantially at a proximal portion of the ADU housing 207 and may comprise a "T-shaped" or doglegged structure.

A proximal portion of the stop 210 may incorporate a compliant or shock absorbing material, such as foam or rubber. This material may dissipate energy, as described below, as the ball nut 204 comes into contact with the stop 210. The stop 210 may be coupled to the ADU housing 207 in any suitable manner. For instance, the stop 210 may be screwed into the ADU housing 207, heat bonded to the ADU housing 207, forged integral to the ADU housing 207, riveted into the ADU housing 207, bolted into the ADU housing 207, adhesively bonded to the ADU housing 207, and the like.

In operation, as the ball nut 204 translates axially in a proximal direction, the ball nut 204 may come into contact with the stop 210. As the ball nut 204 comes into contact with the stop 210, the proximal translation of the ball nut 204 may be halted. The stop 210 may however, unlike other conventional systems, resist or eliminate EMA 200 failure. For example, the stop 210, comprising a continuous annular structure, may not rely upon one or more simple projections (e.g., projections 110 and 112) to arrest the angular momentum of the ball nut 104. Rather, the large (continuous) surface area of the stop 210 may permit the dissipation of angular and axial momentum over a much larger, surface area.

Dissipation of angular and axial momentum over this larger surface area reduces the overall stress experienced by any particular portion of the ball nut 204 and/or ball screw 206 (e.g., the projections 110 and 112 in the conventional system), particularly as the ball nut 204 and/or the ADU housing 207 and/or stop 210 may be manufactured, for durability and strength, from steel or a steel alloy, such as, for example, a hardened steel. The system of the present disclosure therefore embodies a much more reliable, failure-resistant, ball nut 204 stopping system. The cost and weight of the system of the present disclosure may also be reduced over that associated with more conventional systems, as projections 110 and 112 may be eliminated in favor of the stop 210.

In various embodiments, from the stop 210, a computer-based system comprising a processor and a tangible, non-transitory, memory coupled to the processor may track or count the number of motor rotations or revolutions as the ball nut 204 advances distally from the stop 210. This information, in combination with a gear ratio and/or a distance of a portion of the ball nut 204 (e.g., the distal edge of the ball nut 204) from the stop 210 may permit the computer-based system to calculate the position of the ball nut 204 and/or the ball nut 204 actuating mechanism. The location of the ball nut 204 and/or actuator may be fed back into the computer-based system to control the advancement and/or retraction of the ball nut 204 during operation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. §101, so long as and to the extent In re Nuijten remains binding authority in the U.S. federal courts and is not overruled by a future case or statute. Stated another way, the term "computer-readable medium" should be construed in a manner that is as broad as legally permissible.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical actuator (EMA) comprising:
   an EMA housing;
   a ball nut extending axially within the EMA housing;
   a ball screw extending axially within the ball nut; and
   an actuator drive unit (ADU) housing extending axially within the ball screw, the ADU housing having a proximal stop that protrudes from an outer surface of a proximal portion of the ADU housing, the proximal stop including a compliant surface, the compliant surface comprising at least one of a foam or a rubber;
   wherein the ball nut is configured to translate axially in a proximal direction in response to a rotation by the ball screw, and
   wherein the ball nut is configured to be halted in the axially proximal translation in response to contact with the proximal stop.

2. The EMA of claim 1, wherein the proximal stop is coupled to the ADU housing.

3. The EMA of claim 1, wherein the proximal stop comprises a continuous annular structure.

4. The EMA of claim 1, wherein the ball nut makes contact with the proximal stop as the ball nut translates axially to halt the axially proximal translation of the ball nut.

5. The EMA of claim 1, wherein the ball nut is configured to advance axially in a distal direction away from the proximal stop.

6. The EMA of claim 1, wherein the ball nut is configured to retract axially in the proximal direction towards the proximal stop.

7. The EMA of claim 1, wherein a position of the ball nut is determined based upon a gear ratio.

8. An electromechanical actuator EMA comprising:
   an EMA housing;
   a ball nut extending axially within the EMA housing; and
   an actuator drive unit (ADU) housing disposed radially inward of the ball nut, the ADU housing having a proximal stop that protrudes from an outer surface of a proximal portion of the ADU housing and includes a compliant surface, the compliant surface comprising at least one of a foam or a rubber;
   wherein the ball nut is configured to translate axially in a proximal direction, and
   wherein the ball nut is configured to be halted in the axially proximal translation in response to contact with the proximal stop.

9. The EMA of claim 8, wherein the proximal stop is coupled to the ADU housing.

10. The EMA of claim 8, wherein the proximal stop comprises a continuous annular structure.

11. The EMA of claim 8, wherein the ball nut makes contact with the proximal stop as the ball nut translates axially to halt the axially proximal translation of the ball nut.

12. The EMA of claim 8, wherein the ball nut is configured to advance axially in a distal direction away from the proximal stop.

13. The EMA of claim 8, wherein the ball nut is configured to retract axially in the proximal direction towards the proximal stop.

* * * * *